United States Patent [19]
Giuseppina et al.

[11] Patent Number: 5,276,715
[45] Date of Patent: Jan. 4, 1994

[54] METHOD FOR REDUCING THE PHASE NOISE INTRODUCED IN THE RESYNCHRONIZATION OF DIGITAL SIGNALS USING JUSTIFICATION, AND INTEGRATED CIRCUITS FOR THE IMPLEMENTATION OF THE METHOD

[75] Inventors: Licata Giuseppina, Segrate; Lometti Alberto, Merate; Valussi Romano, Agrate, all of Italy

[73] Assignee: Alcatel Italia SpA, Italy

[21] Appl. No.: 810,672

[22] Filed: Dec. 19, 1991

[30] Foreign Application Priority Data

Dec. 21, 1990 [IT] Italy ................. 22496 A/90

[51] Int. Cl.[5] ........................................... H04L 07/00
[52] U.S. Cl. ........................................ 375/118; 375/120
[58] Field of Search ............... 375/118, 119, 120, 99; 328/134, 155; 307/511; 331/25

[56] References Cited
U.S. PATENT DOCUMENTS 4,355,387 10/1982 Postejoie et al. ................. 370/102
5,036,294 7/1991 McCaslin ......................... 375/120
5,052,025 9/1991 Duff et al. ....................... 375/118

*Primary Examiner*—Curtis Kuntz
*Assistant Examiner*—T. Ghebretinsae
*Attorney, Agent, or Firm*—Ostrolenk, Faber, Gerb & Soffen

[57] ABSTRACT

A method for reducing the phase noise introduced in the resynchronization of digital signals using positive, negative or positive-negative justification, in which a phase comparison signal representing the phase difference between signals from a local clock and a remote clock is generated, the comparison signal is modified by a suitable scale factor, the scaled phase comparison signal is integrated at a suitable frequency, the integrated signal is quantized by comparing the integrated signal with predetermined thresholds, and the transitions of the quantized signal are used to determine the justification events which are to be overlapped to a local unjustified clock rate to generate a local justified clock signal.

9 Claims, 6 Drawing Sheets

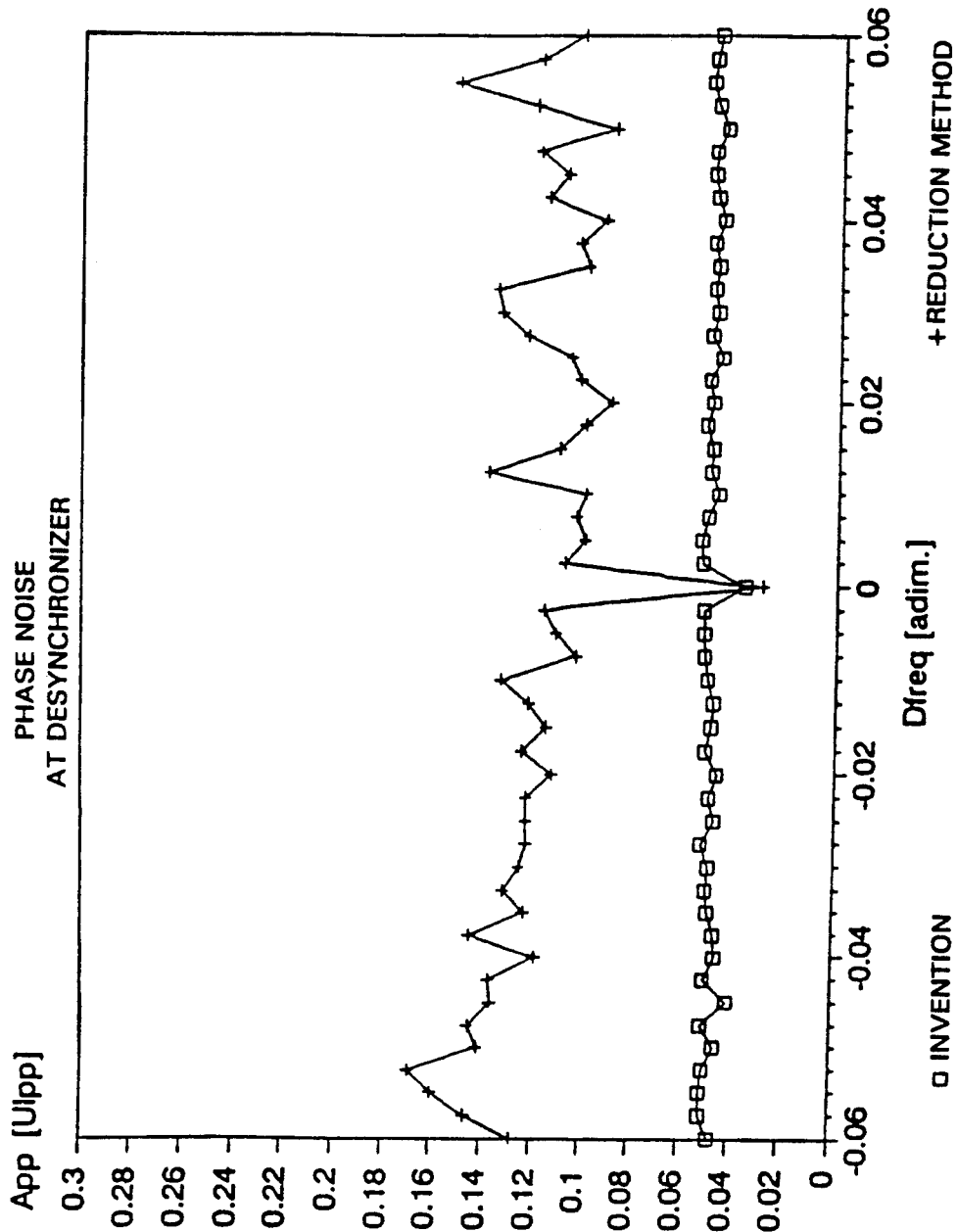

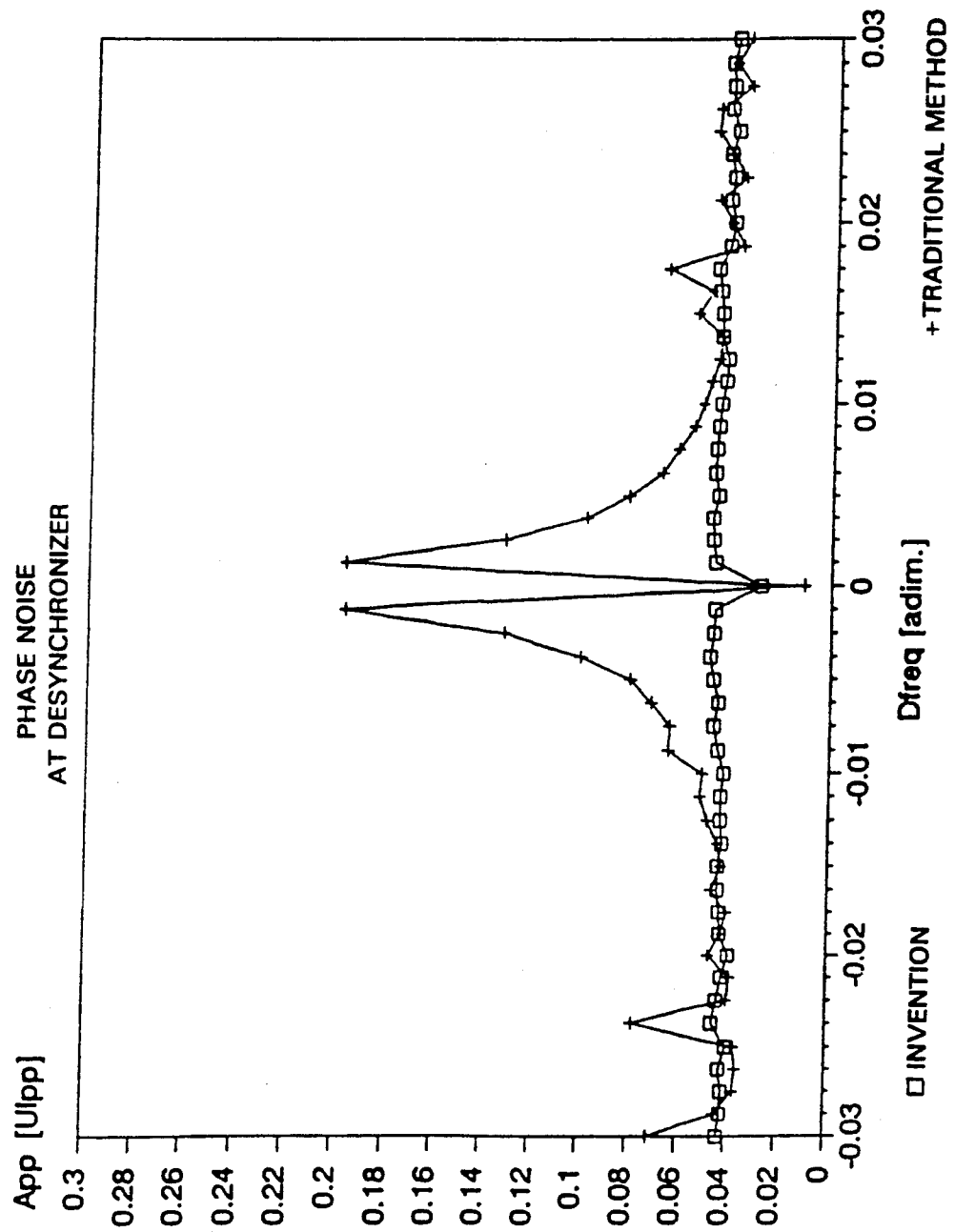

METHOD FOR REDUCING THE PHASE NOISE INTRODUCED IN THE RESYNCHRONIZATION OF DIGITAL SIGNALS USING JUSTIFICATION, AND INTEGRATED CIRCUITS FOR THE IMPLEMENTATION OF THE METHOD

BACKGROUND OF THE INVENTION

1. Field of the Invention

The present invention relates to a method for reducing the phase noise introduced in the resynchronization by justification of digital signals used in data and/or voice transmission. The invention also relates to devices for implementing such a method.

2. Description of the Related Art

In the transmission of numerical data, the justification method is widely used for resynchronizing a plesiochronous stream. The justification method is characterized by its use of a local clock.

In particular, this method is used in numerical multiplexing devices. An international standard (CCITT, e.g. recommendations G707-G709 for synchronous multiplexers) establishes the characteristics of tributary data streams, the characteristics of aggregated data streams, the structures of frames and the position and the number of justification digits for each level of the consolidated multiplexing hierarchies.

The traditional structure of a resynchronizer using justification includes an elastic memory into which data is written at the clock rate associated with the plesiochronous stream, and from which data read out by the local clock, to which is appended a frame that includes digits of the so-called justification or filling. The use (or non-use) of filling digits as information or redundancy allows one to achieve the resynchronization between the remote and local clocking.

There are three types of justification: positive, negative, or positive-negative justification, according to whether the filling digits are normally used as information, not usually used as information, or both types of justification digits are present in each frame.

Conventionally, the use of justification digits is established once each frame, based on a comparison between the digital signal representing the phase difference between the local and remote clock and a fixed threshold (in the case of positive or negative justification) or two thresholds (in the case of positive-negative justification).

It is well known from the literature (e.g. D. L. Dutweiler, "Waiting Time Jitter", *Bell Syst. Tech. J.* Vol. 51, January 1972, identified the following as D1), that operating justification in the above mentioned manner introduces phase noise in the resynchronized data stream, that is clearly evident at the moment of desynchronization by PLL ("Phase Locked Loop") and that depends on the frequency of the data stream, on the local clock frequency and on the frame structure, through the value of the filling ratio $\rho$, defined as:

$$\rho = \frac{f_{reading} - f_{writing}}{f_{frame}} \quad (1)$$

In particular, the phase noise is particularly high when the filling factor reaches values near to a rational number p/q, where p and q are positive integer numbers.

The worst case is positive-negative justification, in which the value of filling ratio is near zero and the phase noise can have an amplitude of 1 UIpp ("Unit of peak-peak pulse").

The international standard establishes the limit of the phase noise which can be present in the desynchronized stream (CCITT, e.g. recomm. G783 for the synchronous multiplexers) and, in the case of plesiochronous multiplexers, it establishes the frame structures, and these limits must be respected when operating the justification by the above-mentioned conventional method.

The case of synchronous hierarchy, whose standardization process is actually the execution phase, clearly shows that the structures of the standardized frames do not allow the conventional fulfillment of the justification techniques, as the introduced phase noise can be too high.

In fact, the so-called "mappings" of plesiochronous tributaries in VCs ("Virtual Containers") of the frame STM-1 ("Synchronous Transport Module of Level 1"), forming the base frame of the synchronous hierarchy, cause filling ratios particularly unfavorable with regard to the phase noise introduced in the signal, and in some circumstances, they cause the worst case of positive-negative justification, with the filling ratio being close to zero.

The literature has recently proposed (e.g. Choi, "Waiting Time Jitter Reduction", *IEEE Trans. on Comm.*, Vol. 37, no. 11, November 1989, identified in the following as D2) different techniques for reducing the phase noise introduced by the resynchronization process in the case of positive-negative justification. These techniques are all based on the hypothesis that it is possible to reduce the phase noise by artificially modifying the value of the filling ratio by utilizing a procedure for generating the phase comparing signal which is more complex than the procedure employed in conventional techniques.

Using the proposed techniques, it is possible to reduce the phase noise of resynchronization following the positive-negative justification within the limits established in international standardization, using circuits of increased complexity for performing the phase comparison. But the solution offered by these techniques has a limit and a drawback.

The limit is that the literature does not disclose techniques suitable for reducing the phase noise in the case of purely positive or negative justification, where the filling ratio is "unfavorable" in the above-mentioned meaning.

The drawback is that the reduction value is limited by the presence of "peaks" in phase noise obtained after the desynchronization towards the detuning of the plesiochronous stream with respect to the normal frequency value.

To better understand the above problems, reference is made to FIG. 1, which shows the result of a plesiochronous tributary at 2,048 Mb/sec mapped by the positive-negative justification in a VC-12 ("Virtual Container with level 1,2") of a frame STM-1. The ordinate indicates the peak-peak amplitude App of the phase noise or jitter, resulting from the desynchronization made by PLL, while the abscissas represents the detuning $D_{freq}$ between the real frequency of the plesiochronous flow and the nominal frequency, normalized at the frame frequency.

It is possible to cause the peaks to remain included within the standard limits, typically by the selection of a suitable value of $\rho$ obtained with a corresponding increase of the circuit complexity, but it is not possible to avoid completely these peaks.

SUMMARY OF THE INVENTION

A first object of the present invention is a method by which both the above-described limit and drawback can be eliminated, i.e., a justification procedure that operates with positive, negative or positive-negative justification and allows one to reduce the resynchronization phase noise to a value practically independent from the detuning of the plesiochronous stream with respect to nominal frequency value.

This and other objectives are achieved by the method of the invention, in which:
- a phase comparison signal representing the phase difference between signals from a local clock and a remote clock is generated,
- the comparison signal is modified by a suitable scale factor,
- the scaled phase comparison signal is integrated at a suitable frequency,
- the integrated signal is quantized by comparing the integrated signal with predetermined thresholds, and
- the transitions of the quantized signal are used to determine the justification events which are to be overlapped to a local unjustified clock rate to generate a local justified clock signal.

BRIEF DESCRIPTION OF THE DRAWINGS

The different features and advantages of the invention will be more readily understood by the following description of some (preferred but not limiting) embodiments when read in conjunction with the accompanying drawings, in which:

FIG. 5 shows the results of a simulation of the invention for the embodiment of FIG. 1, when compared with the results already referred in said figure; and FIG. 6 shows the results of a simulation related to the application of the invention to the case of the plesiochronous tributary at 44,736 Mb/s, mapped by positive justification in a VC-12 (Virtual Container of level 3.2") of a frame STM-1, and, by comparison, the performances related to the application of the conventional techniques.

DETAILED DESCRIPTION OF THE PREFERRED EMBODIMENTS

Figure 1:
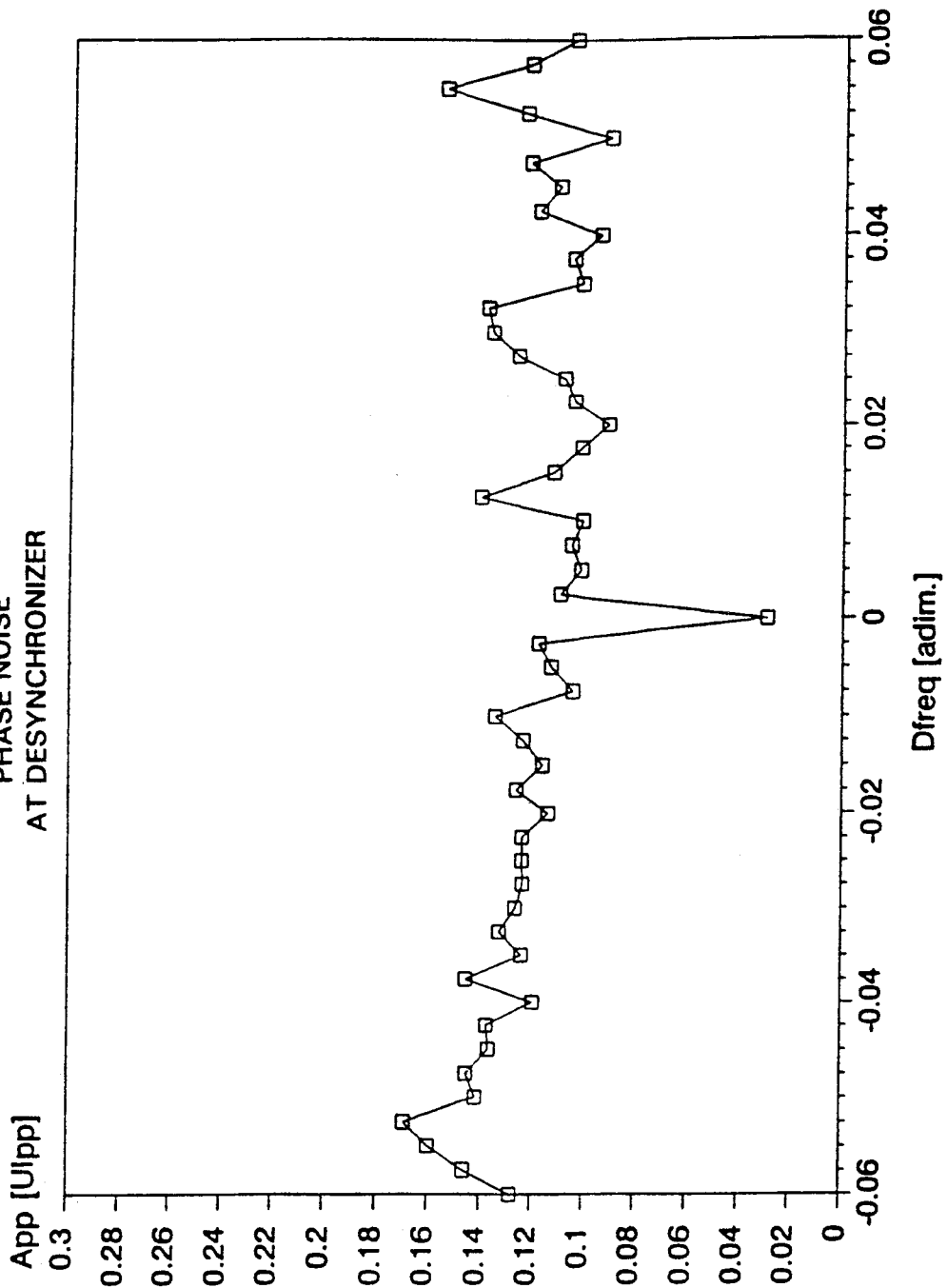
FIG. 1 shows the result of a plesiochronous tributary at 2,048 Mb/sec mapped by the positive-negative justification in a VC-12 ("Virtual Container with level 1,2") of a frame STM-1.
Figure 2:
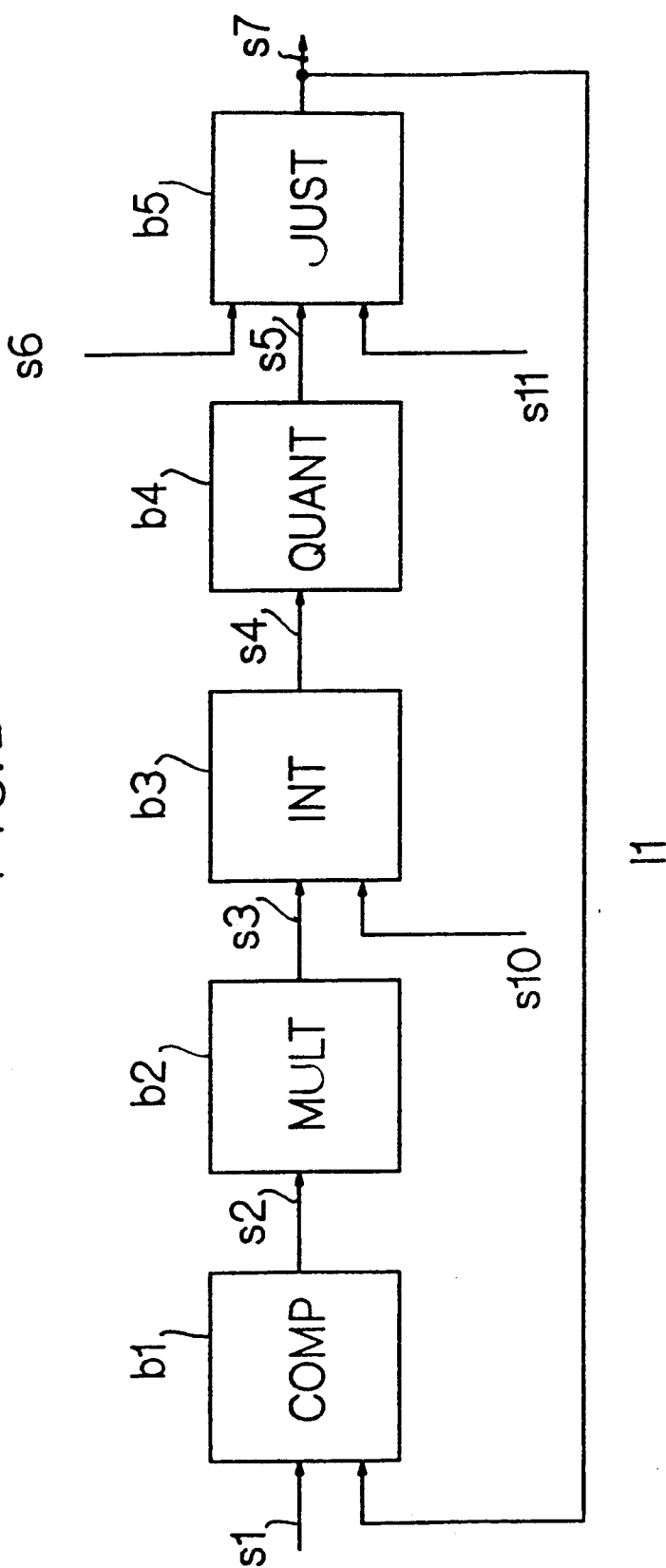
FIG. 2 shows a block scheme of the method according to the invention in a simplified embodiment.

FIG. 2 shows a block b1 (COMP) representing the phase comparison between the remote clock signal s1, coming from a far away source (not shown) and associated with the data stream to be resynchronized, and the local justified clocking signal s7.

The result of the processing by block b1 is a signal having a phase difference s2, which is multiplied in block b2 (MULT) by a constant K1, thus generating so a signal s3. Block b3 (INT) carries out an integration of the signal s3 at clock frequency s10 and generates an integrated signal s4, which is compared with the thresholds, assumed to be infinite, of an ideal quantizer (block b4, QUANT), K being the separation between the thresholds.

The output of block b4 is a signal s5 quantized with step K, whose transitions, sampled at clock frequency s11, generate the justification events in the block b5 (JUST); these events are overlapped at prefixed time periods to a local clocking signal s6 to generate the resynchronized clocking for the justification s7. The application of s7 at the input of the block b1 by means of line 11 closes the feedback loop, resulting in the generation of a mean equality relationship between the frequencies of clocks s1 and s7, the result to which the justification technique is directed.

The described structure is a discrete, nonlinear and sampled control system which works well, although the justification events can occur only at predetermined instants of time.

Figure 3:
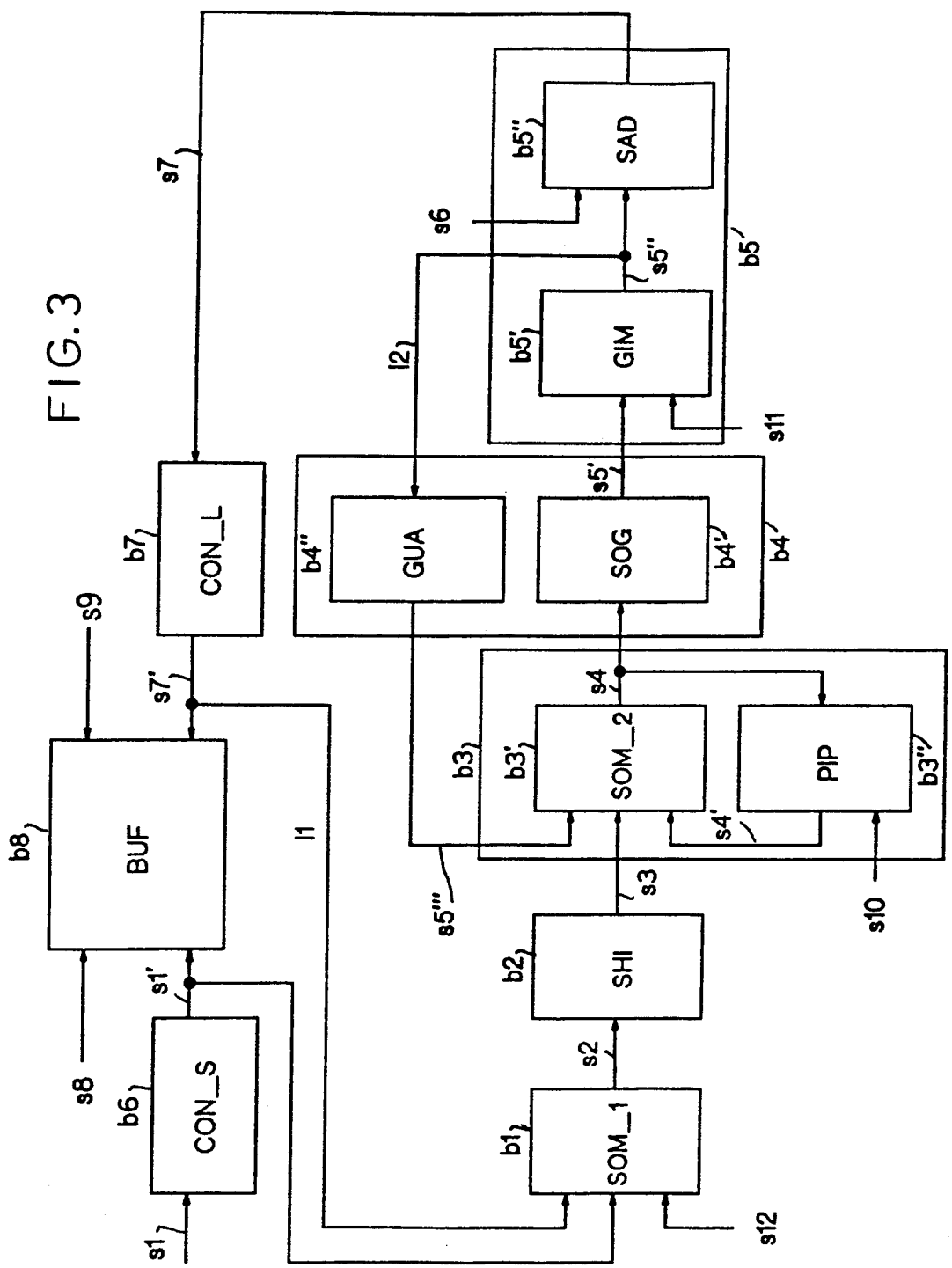
FIG. 3 represents one of the possible and advantageous implementations of the method.

A possible implementation of the method, using a completely digital technique, is shown in FIG. 3, in which an elastic memory (block b8, BUF) works as an interface between the data (s8) associated with the remote clock signal s1 and the data (s9) resynchronized by the justification with the local clock signal s7.

In FIG. 3, reference symbol s1' indicates the numerical value, encoded in a binary system as a 2's complement of the phase associated with the writing clock of the elastic memory, generated by a writing counter controlled by s1 (block b6, CON_S), and s7' represents a similar signal related to the reading clock generated by a reading counter controlled by s7 (block b7, CON_L).

The reading and writing phases are compared in the block b1 (SOM_1), block b1 being a digital adder (2's complement) which adds a constant polarization value s12, whose value depends on the mean frequency of the unjustified clock s6 and the size of the memory b8.

The resulting digital signal s2 is multiplied by a constant coefficient K1, dimensioned as a power of 2, which can therefore be implemented by a shifter (block b2, SHI), generating the digital signal s3.

This signal is applied to a digital member b3, formed of blocks b3' (SOM_2) and b3" (PIP), i.e. a digital adder (2's complement) and a register of the "parallel input—parallel output" type. The register is clocked at frequency s10; in the preferred embodiment, this clock rate corresponds to the frequency at which the elastic memory is read (that is, the clock signal which advances the counter b7 (CON_L)). However, any frequency value under Shannon's theorem relative to the signal s7' sampling is suitable.

The cumulative value s4 is quantized with step K in the block b4; block b4 is formed of a circuit with one or two thresholds (b4', SOG), a feedback line 12, and a gain block b4" (GUA).

Block b4' includes a single threshold in case the system must apply decisions related to purely positive or negative justifications, or two thresholds in case the system must apply decisions related to both of justification types.

The result of the comparison with the threshold s5' is applied to the justifier b5, formed of a pulse generator b5' (GIM) and a suppressor/adder of clock pulses b5" (SAD).

Block b5' generates pulses in correspondence with the shootings of thresholds of b4', with positive or negative polarity according to the sign of the direction in which the threshold has been exceeded. The operating frequency of the device is s11, which is equal to the maximum possible frequency allowed for the occurrence of justification events.

The polarized pulse series s5", on the one side, is applied by line 12 to the gain block b4''', and on the other side causes, in block b5''', the overlapping of positive or negative justifications according to the signs of the pulses, the local clock s6 generating the resynchronized clock rate for the justification s7.

Line 12 and block b4''' establish the value K, input to the accumulator b3, for each justification event and having a sign depending on the sign of the introduced justification. This limits the dynamics of the accumulator b3 and the dynamics of the threshold circuit b4' that, in the scheme of FIG. 2, must be considered nominally as infinite.

The reading counter b7 of the elastic memory reconstructs s7', which is applied to phase comparison block b1, closing of the feedback loop.

Figure 4:
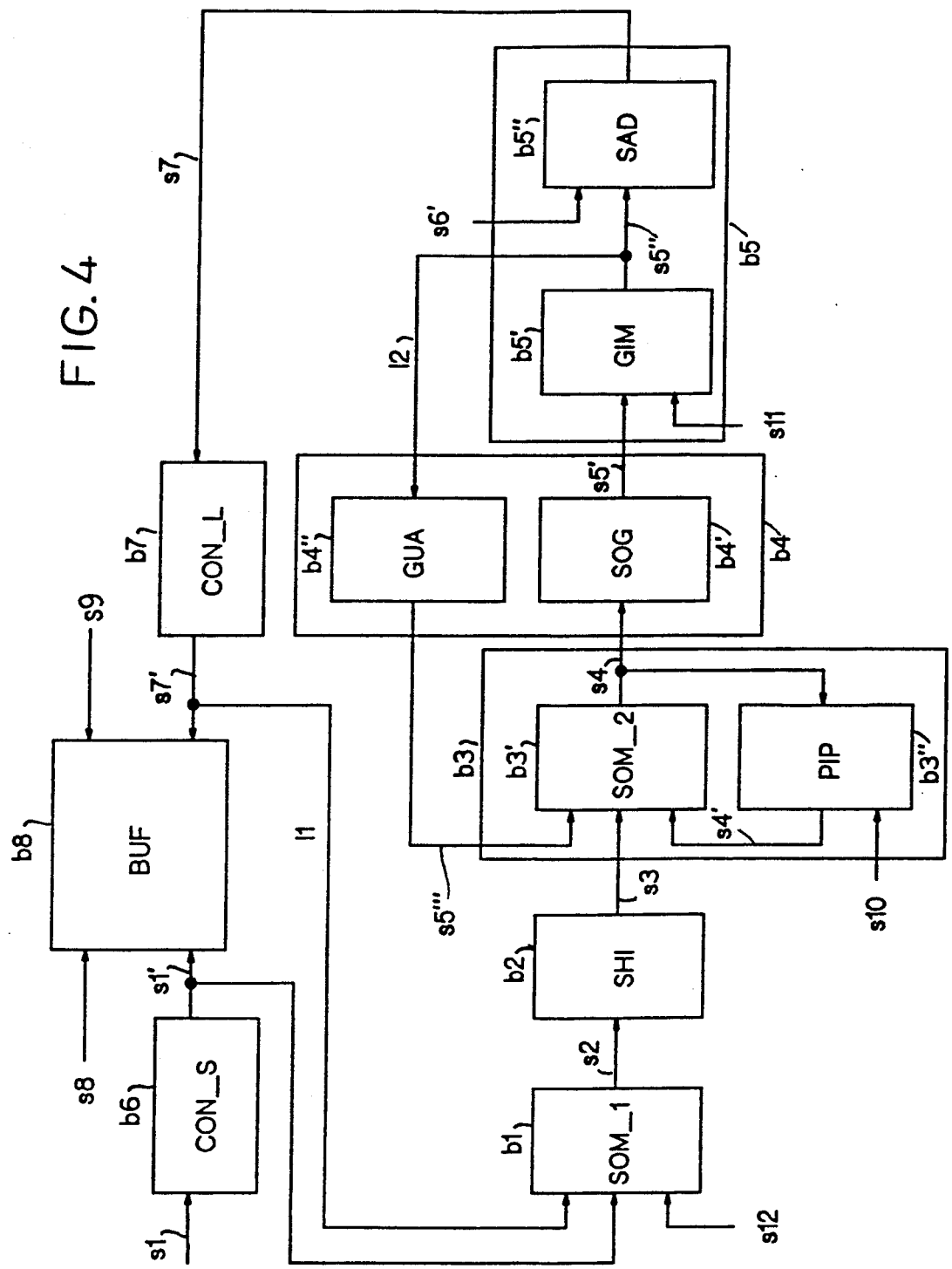
FIG. 4 represents a variant of the implementation described in FIG. 3.

FIG. 4 represents a variant of the scheme of FIG. 3, in using a circuit having a single threshold (block b4', SOG), also for the case of a frame characterized by positive-negative justification. Using this implementation, the local unjustified clock signal s6 is formed by a signal s6', on which rigidly preestablished justifyings of determined polarity are overlapped at suitable frequency. In this case, the invention accomplishes justifications of polarity opposite to the determined polarities which are necessary to achieve resynchronization.

The operation of the invention can be expressed mathematically as follows:

With reference to FIG. 2, the mean frequency $f_I$ of the justification events generated on the signal s7 due to a value $\phi_D$ of the phase comparison signal s2 can be written as follows:

$$f_I = K1/K \phi_D f_{CAMP} \qquad (2)$$

where $f_{CAMP}$ is the value of the frequency of clock s10.

Therefore, the assembly of blocks b2, b3, b4, b5 is generally similar to a controlled oscillator of the type NCO ("Number Controlled Oscillator"), whose gain is:

$$\frac{f_1}{\phi_D} = K1/K \cdot f_{CAMP} \qquad (3)$$

and then the invention can be considered a Phase Locked Loop (PLL) of the first order, having a bandwidth B equal to (see e.g. F. M. Gardner, "Phaselock Techniques", Wiley, 1966):

$$B = \frac{f_{CAMP} \cdot K1}{2\pi K} \qquad (4)$$

As is known from the theory of automatic controls (e.g. see S. Bittani, N. Schiavone, "Models and Controls", Vol. II, CLUP, 1979), a system of this type acts as a low-pass filter with respect to a signal input towards the phase comparator, and as a high-pass filter with respect to a signal sent to output towards the controlled oscillator.

Since the phase resynchronization noise is an effect of the quantization related to the justification process, it can be considered a signal sent into the feedback loop to the output of the block b5, and then to the output of controlled oscillator.

Consequently, the device carries out a high-pass filtering operation on the resynchronization phase noise with a notch frequency given by the equation (4), and therefore it can be suitably adjusted by the selection of the coefficients K and K1 for each operating condition related to the frequency of the incoming plesiochronous flow and to the type of justification used.

This filtering allows one to eliminate the low frequency components of phase noise; the high frequency components are automatically cut by the PLL that makes the desynchronization in reception.

The results obtained by the application of this method are shown in FIGS. 5 and 6.

In the case of positive-negative justification (FIG. 5), comparison is made with one of the reduction techniques recently proposed in literature referred to above, while a comparison with the conventional technique is made in the case of purely positive or negative justification (FIG. 6).

The improvements obtained in both cases by the application of the invention are evident in terms of uniformity and absolute values of attenuation of the phase noise generated by the resynchronization process.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A method for reducing phase noise introduced during resynchronization by justification of digital signals used in data and/or voice transmission, comprising the steps of:
   (a) generating a phase comparison signal representing the phase difference between a local justified clock signal and a remote clock signal,
   (b) scaling said comparison signal by multiplying the comparison signal by a constant,
   (c) integrating the modified phase comparison signal at a predetermined frequency,
   (d) quantizing the integrated signal by comparing the integrated signal with predetermined thresholds, and
   (e) utilizing transitions of the quantized signal to determine which justification events are to be overlapped with a local unjustified clock signal to generate said local justified clock signal.

2. A method according to claim 1, wherein the predetermined frequency of said integration and the value of a said constant utilized for scaling the comparison signal are selected in accordance with a transmission bandwidth.

3. A method according to claim 1, wherein justifications are either added or removed from the digital signals depending upon whether the integrated signal has an increasing or decreasing behavior.

4. A method according to claim 1, wherein a case of positive-negative justification is reduced to a case of purely positive or purely negative justification by introducing preestablished justifications of predetermined polarity into the unjustified local clock signal.

5. A device for reducing phase noise introduced during resynchronization by justification of digital signals used in data and/or voice transmission, comprising:

(a) means for generating a phase comparison signal representing the phase difference between a signal from a local justified clock and a signal from a remote clock, (b) means for scaling said comparison signal by multiplying the signal by a constant, (c) means for integrating the modified phase comparison signal at a predetermined frequency, (d) means for quantizing the integrated signal by comparing the integrated signal with predetermined thresholds, and (e) means for generating said local justified clock signal by utilizing transitions of the quantized signal to determine which justification events are to be overlapped with a local unjustified clock signal to generate said local justified clock signal.

6. A device in accordance with claim 5, wherein said means for generating a comparison signal comprises a digital adder, said means for scaling comprises digital shifter, said means for integrating comprises a digital adder and a parallel input—parallel output register, said means for quantizing comprises a comparator circuit with one or two thresholds, and said means for generating said local justified clock signal comprises a pulse generator, and a suppressor/adder of clock signals.

7. A device according to claim 6, further comprising an elastic memory formed of a buffer, a writing counter and a reading counter, said elastic memory acting as an interface between data associated with the remote clock and data associated with the justified local clock.

8. A device according to claim 7, said wherein said means for generating a phase comparison signal includes means for performing 2's complement binary subtraction of data from the writing and reading counters of the elastic interface memory.

9. A device according to claim 8, wherein said means for generating a phase comparison signal includes means for adding a constant to the phase comparison signal, said constant being based upon the size of the elastic memory and the mean frequency of the local unjustified clock signal.

* * * * *